US012631137B2

(12) United States Patent
Fehmi

(10) Patent No.: US 12,631,137 B2
(45) Date of Patent: May 19, 2026

(54) TANGENTIAL INTERNAL COMBUSTION ENGINE

(71) Applicant: FNF INNOVATION SH.P.K., Gjilan (AL)

(72) Inventor: Mustafa Fehmi, Gjilan (AL)

(73) Assignee: FNF INNOVATION SH.P.K., Gjilan (AL)

( * ) Notice: Subject to any disclaimer, the term of this patent is extended or adjusted under 35 U.S.C. 154(b) by 0 days.

(21) Appl. No.: 19/102,299

(22) PCT Filed: Aug. 3, 2023

(86) PCT No.: PCT/EP2023/071582
§ 371 (c)(1),
(2) Date: Feb. 7, 2025

(87) PCT Pub. No.: WO2024/033225
PCT Pub. Date: Feb. 15, 2024

(65) Prior Publication Data
US 2026/0055723 A1      Feb. 26, 2026

(30) Foreign Application Priority Data

Aug. 10, 2022   (EP) ..................................... 22189682
Oct. 10, 2022   (EP) ..................................... 22200602

(51) Int. Cl.
*F02B 75/26*           (2006.01)
*F01B 5/00*            (2006.01)
(Continued)

(52) U.S. Cl.
CPC .............. *F02B 75/265* (2013.01); *F01B 5/00* (2013.01); *F01C 1/073* (2013.01); *F01C 9/00* (2013.01);
(Continued)

(58) Field of Classification Search
CPC .......... F02B 75/265; F01B 5/00; F01C 1/073; F01C 9/00; F01C 11/002; F01C 21/00; F16C 7/023; F16D 41/24
See application file for complete search history.

(56) References Cited

U.S. PATENT DOCUMENTS

| | | |
|---|---|---|
| 299,161 A | 5/1884 | Peppard |
| 1,352,127 A | 9/1920 | Henderson |
| | (Continued) | |

FOREIGN PATENT DOCUMENTS

| | | |
|---|---|---|
| DE | 4201569 A1 | 7/1993 |
| DE | 102007039912 A1 | 2/2009 |
| DE | 102009034488 A1 | 4/2010 |

OTHER PUBLICATIONS

International Search Report for PCT/EP2023/071582 (Oct. 23, 2023).

*Primary Examiner* — Hoang M Nguyen
(74) *Attorney, Agent, or Firm* — Merchant & Gould P.C.

(57) ABSTRACT

An internal combustion engine with two arced cylinders, with movement of the pistons in first and second cylinders takes place in the same direction. An arcing connecting rod on each of the sides of the pistons are averted from the combustion chambers. A freewheel is associated with each cylinder. An axis of the shaft represents the center of the arced shape of the cylinders and connecting rods. A side of the connecting rod opposite the piston connects to the outer side of a freewheel, and inner sides of the freewheels each connect to the shaft. Movement produced by the combustion is transmitted by the connecting rod to the outer side of the freewheel and the shaft. Outer sides of the freewheels are coupled to move in opposite directions, so the pistons in the first and the second cylinder run oppositely. A method operates such an internal combustion engine.

16 Claims, 3 Drawing Sheets

(51) Int. Cl.

| | |
|---|---|
| *F01C 1/073* | (2006.01) |
| *F01C 9/00* | (2006.01) |
| *F01C 11/00* | (2006.01) |
| *F01C 21/00* | (2006.01) |
| *F16C 7/02* | (2006.01) |
| *F16D 41/24* | (2006.01) |

(52) U.S. Cl.
    CPC ............ *F01C 11/002* (2013.01); *F01C 21/00* (2013.01); *F16C 7/023* (2013.01); *F16D 41/24* (2013.01)

(56)                    References Cited

U.S. PATENT DOCUMENTS

| | | | | |
|---|---|---|---|---|
| 1,790,534 | A * | 1/1931 | Chevallier | .............. F01C 1/073 418/35 |
| 1,917,180 | A * | 7/1933 | Zwick | ..................... F01C 9/002 123/197.1 |
| 2,170,213 | A * | 8/1939 | Prew | ....................... F01C 1/063 123/197.1 |
| 4,127,036 | A | 11/1978 | Pinto | |
| 4,167,922 | A | 9/1979 | Doundoulakis | |
| 5,025,756 | A | 6/1991 | Nye | |
| 9,464,675 | B1 * | 10/2016 | He | ........................ F16D 41/063 |
| 2011/0185998 | A1 * | 8/2011 | Murphy | ................... F01C 9/00 123/18 A |

* cited by examiner

TANGENTIAL INTERNAL COMBUSTION ENGINE

This application is a National Stage Application of International Patent Application No. PCT/EP2023/071582, filed Aug. 3, 2023, which claims benefit of priority to European Patent Application Nos. 22189682.2, filed Aug. 10, 2022, and 22200602.5, filed Oct. 10, 2022, and which applications are incorporated herein by reference. To the extent appropriate, a claim of priority is made to each of the above disclosed applications.

The present invention relates to a novel internal combustion engine.

In the development of internal combustion engines, one of the main objectives is to utilize the energy present in the fuel used as effectively as possible, that is, to achieve as high an efficiency as possible, in order to thereby save fuel.

Reciprocating piston engines are known in the prior art in which the work generated by the gases produced by combusting the fuel expanding in a cylinder is transferred to a crankshaft by means of a piston rod, wherein the piston rod comprises an articulated connection to each of the piston and the crankshaft (crank drive). The oscillating motion of the piston is thus transformed into a rotary motion, that is, a torque is produced.

One disadvantage of the force transfer in said conventional reciprocating piston engines is that mechanical dead center points are present due to the crank drive and the transferred force drops off in a sinusoidal curve when approaching said points.

The object of the present invention is to further increase the efficiency of conventional internal combustion engines in order to thus enable fuel-saving operation.

An internal combustion engine is known from U.S. Pat. No. 4,127,036, having at least one annular cylinder and an annular piston matching the same, wherein the cylinder and piston are configured to rotate about a central crankshaft. The circular rotation of the piston and of the cylinder in a first direction is transferred to the shaft by means of feeding means preventing rotation thereof in the opposite direction.

An internal combustion engine is known from U.S. Pat. No. 5,025,756 having a set of annular 360-degree cylinders, each comprising two sets of double-headed pistons. The piston sets are displaced back and forth by about 45 degrees within the cylinder between two combustion openings spaced apart from each other by 180 degrees. The back-and-forth motion of the piston sets is converted into a rotary motion by means of four ratchet and latch mechanisms connected to circular gear sets.

An internal combustion engine is known from U.S. Pat. No. 1,352,127, having a plurality of cylinders disposed in a circle, wherein the axes thereof are aligned in the circumferential direction and the pistons thereof are connected to an oscillating element, whereby said cylinders act in a synchronized manner, and wherein the oscillating element is connected to a rotor by means of a suitable ratchet mechanism.

SUMMARY OF THE INVENTION

The present invention is based on the insight that a special shape of the cylinder makes it possible for the piston stroke motion generated therein to be converted directly into a torque and thus for the transferred force to always be transferred to a shaft tangentially, that is, at a sinusoidal angle of 90°.

The present invention therefore provides an internal combustion engine having two cylinders 7, 7' having a circular arc shape in the longitudinal direction thereof, one piston 5, 5' being disposed in each of said cylinders so as to be able to move from a position at a minimum distance from the cylinder head $P_{min}$ to a position at a maximum distance from the cylinder head $P_{max}$, and a shaft 11, the cylinders 7, 7' being disposed such that the motion of the piston 5 in the first cylinder 7 generated by the combustion of fuel in the combustion chamber 4 of the first cylinder 7 and the motion of the piston 5' in the second cylinder 7' generated by the combustion of fuel in the combustion chamber 4' of the second cylinder 7' occur in the same direction, characterized in that one piston rod 6, 6' each, having a circular arc shape in the longitudinal direction thereof, and one freewheel associated with each cylinder 7, 7' are present at the sides of the pistons 5, 5' facing away from the combustion chambers 4, 4', wherein the cylinders 7, 7' are further disposed so that the axis of the shaft 11 is the center point of the circle defining the circular arc shape of the cylinders 7, 7' and of the piston rods 6, 6', the side of each piston rod 6, 6' opposite the piston 5, 5' of the first and the second cylinder 7, 7' is connected to the outer side 8, 8' of one of the freewheels, and the inner sides 10, 10' of the freewheels are each connected to the shaft 11, the freewheels are disposed such that the motion generated by the combustion of fuel in the combustion chamber 4, 4' of a cylinder 7, 7' and transferred by the piston rod 6, 6' of a piston 5, 5' to the outer side of the freewheel 8, 8' is transferred to the shaft 11, and the freewheels each run freely in the opposite direction, and the outer sides of the freewheels 8, 8' are coupled to each other so as to perform a motion in the opposite direction, whereby the motion of the pistons 5, 5' in the first and second cylinder 7, 7' also runs in opposite directions.

The internal combustion engine according to the present invention may also be referred to as a "tangential internal combustion engine," or simply a "tangential engine," due to the particular embodiment and arrangement of the cylinders and the particular conversion of the forces arising during fuel combustion into a torque.

The embodiment of the tangential engine causes the tangential forces to always act and be transferred at a maximum possible sinusoidal angle of 90° throughout the entire work process. Said engine thus provides the advantages that both as high a torque as possible is achieved even at low engine speeds, that is, as constant a torque as possible is achieved at various engine speeds. This makes possible a higher efficiency of the engine according to the invention in comparison with conventionally designed reciprocating piston engines, and thereby also fuel savings. The engine also does not require a crankshaft and thus has no dead center points caused by the crank drive in conventional engines.

The engine according to the invention "transforms" a circular arc-shaped reciprocating motion of the pistons displaced in the cylinders directly into a constant rotary motion of the shaft. Thus, no force needs to be deflected by means of various components, as in conventional internal combustion engines. The engine accordingly provides power when requested without any delay.

The internal combustion engine according to the invention may be of any arbitrary size, from relatively small embodiments such as an engine for a motorcycle, to motor vehicle, boat, and aircraft engines, to very large embodiments such as ship engines. The compact form of the engine enables space-saving installation possibilities.

The working principle of the engine according to the invention is identical to that of conventional internal combustion engines: The force is generated by the explosive combustion of a fuel in the combustion chambers of the cylinders and is converted into a torque of a shaft, wherein said converting takes place in a novel manner as described above.

To this end, a combustible fuel-oxygen mixture, typically a fuel-air mixture, is introduced into the combustion chambers of the cylinders, compressed there, and then ignited near the piston position having a minimum distance from the cylinder head ($P_{min}$). The gases thus generated expand in an explosive manner and each cause the motion of the piston in the direction toward the position at a maximum distance from the cylinder head $P_{max}$.

The motion of the pistons in the first and second cylinder is in opposite direction in the engine according to the invention, that is, when the piston in the first cylinder is displaced from the position $P_{min,1}$ to $P_{max,1}$, the piston in the other cylinder is simultaneously displaced from the position $P_{max,2}$ to $P_{min,2}$.

The motions of the pistons from $P_{min,1}$ to $P_{max,1}$ and $P_{min,2}$ to $P_{max,2}$ are then in the same direction at different points in time.

The freewheels each have an outer side and an inner side and may, for example, be implemented as an outer ring and inner ring able to be locked (driving mode) or to run freely (freewheel mode) relative to each other.

By means of the piston rods of the pistons, the force is transferred to the outer side of the freewheel associated with the cylinder in each case, and in turn said freewheel converts the force into a torque of the inner side thereof and thus into a torque of the shaft connected to the inner side of the freewheel; that is, in said direction, the freewheel is in driving mode (locking direction).

As soon as the piston has exceeded the position $P_{max}$, the direction of motion of the piston in the cylinder reverses, that is, the piston is displaced in the direction $P_{min}$. The freewheel associated with said cylinder is thus in freewheel mode (freewheel direction).

The motion of the piston from the position $P_{max}$ to $P_{min}$ is caused by the coupling of the outer sides of the freewheels bringing about an opposite motion of the outer sides of the freewheels and thus of the piston rods and the pistons connected thereto. Thus, "the piston is brought back".

Each piston rod is disposed and is guided in the cylinder so that said rod is displaceable in the cylinder without hindrance.

The piston rod or rods may, in contrast to conventional internal combustion engines where an articulated connection is necessary, be connected to each associated piston in a stationary manner, that is, rigidly.

Furthermore, the piston rod or rods may be connected to each associated outer side, preferably outer ring, of the associated freewheel in a stationary manner, that is, rigidly.

The motions of the pistons in the two cylinders are typically such that, when the piston of the first cylinder is present at the position of minimal distance from the cylinder head $P_{min,1}$, the piston is present in the second cylinder at the position of maximum distance from the cylinder head $P_{max,2}$.

Typically, the freewheel or freewheels are designed so as to comprise a complete inner ring and a complete outer ring.

As a rule, the cylinder or cylinders and thus also the piston or pistons have a circular cross section.

The two cylinders are typically identical and in particular typically have the same circular arc-shaped piston path (stroke).

The pistons, piston rods, and/or the freewheels associated with the first or second cylinder are then also preferably identical to each other.

The longitudinal extent of the cylinders or of the piston paths may be expressed in degrees of angle, due to the circular arc shape thereof, wherein 360° corresponds to a full circle, as is known.

In the internal combustion engine according to the invention, the circular arc-shaped longitudinal extent of one or both cylinders is preferably 60° or more, preferably 90° or more, further preferably 120° or more, and still further preferably 160° or more with respect to the circle defining the circular arc shape thereof.

The circular arc-shaped longitudinal extent of one or, further preferably, both cylinders with respect to the circle defining the circular arc shape thereof is typically no greater than 180°.

The circular arc-shaped longitudinal extent of one or, further preferably, both cylinders with respect to the circle defining the circular arc shape thereof is preferably selected so that said extent corresponds to the maximum possible extent, for example between 170° and 178°.

Furthermore, in the internal combustion engine according to the invention, the circular arc-shaped piston path of the piston in one or, further preferably, both cylinders is preferably 60° or more, preferably 90° or more, further preferably 120° or more, and still further preferably 160° or more with respect to the circle defining the circular arc shape thereof.

The circular arc-shaped piston path of the piston in one or, further preferably, both cylinders with respect to the circle defining the circular arc shape thereof is typically no greater than 180°.

The circular arc-shaped piston path of the piston in one or, further preferably, both cylinders with respect to the circle defining the circular arc shape thereof is preferably selected so that said path corresponds to the maximum possible extent, for example between 170° and 178°.

For example, a maximum possible extent of the piston path of 356° with respect to a full circle or to a complete revolution of the shaft can thus be achieved.

Further preferably, the coupling of the motions of the outer sides of the freewheels in the opposite direction takes place by means of a gear connection. Said connection may, for example, be implemented by gear teeth, present on each of the circular disc-shaped lateral surfaces of the outer rings of the freewheels facing toward each other, in the manner of a crown gear and of a spur gear present between the same.

Such a gear connection is simple to implement and provides high operational reliability.

Preferably, one or both cylinders is or are disposed directly above the outer side of the respectively associated freewheel. This enables a simple connection of the piston rods to the associated outer side of the freewheels.

In one embodiment of the internal combustion engine according to the invention, the cylinders are disposed offset in the tangential direction with respect to a circle defined by the axis of the shaft as the center point. For example, if exactly two cylinders are present in the engine, said cylinders may be disposed offset by 180°. If said cylinders have a longitudinal extent of 180°, then with respect to the full circle about the shaft, the second cylinder "begins" where the first cylinder "ends".

Typically, at least one intake valve and one exhaust valve are present for each cylinder in the internal combustion engine according to the invention.

Typically, one spark plug is present per cylinder.

The internal combustion engine according to the invention may comprise exactly two cylinders, but also more than two cylinders. Preferably, a multiple of 2 cylinders, for example 2, 4, 6 cylinders etc., are present in the internal combustion engine according to the invention.

The internal combustion engine according to the invention may be implemented as a 2-cycle engine or also as a 4-cycle engine, for example.

For the embodiment as a 2-cycle engine, the scavenging, that is, the expulsion of the combustion gases and infeed of fresh gas in the cylinder, may take place in a known manner, for example by means of crossflow scavenging, uniflow scavenging by means of a poppet valve, for example, or by means of loop scavenging.

For the embodiment as a 4-cycle engine, then, at least 4 cylinders are typically present, preferably two pairs of one first and one second cylinder having associated components, in one of the embodiments described here.

The motions of the outer side of one of the freewheels of the first cylinder pair may then be coupled to the outer side of one of the freewheels of the second cylinder pair, so that said coupling takes place in the opposite direction, wherein the piston in the cylinder of the first cylinder pair associated with the freewheel and the piston in the cylinder of the second cylinder pair associated with the freewheel, being kinematically coupled to each other, perform a motion in opposite directions.

In an analogous manner, the motions of pistons or outer sides of the freewheels are preferably also coupled if even more cylinders, for example 6, 8, etc., are present in the engine.

Gears and bearings of the engine according to the invention are typically supplied with lubricant in a conventional manner.

If not already explicitly noted, wherever applicable, all embodiments described as "typical," "usual," or "preferable" and referring to one cylinder and/or the associated components thereof also apply as "typical," "usual," or "preferable" for all other cylinders of the internal combustion engine. The same applies for described pairs of cylinders.

The present invention further relates to a method for operating an internal combustion engine in one of the embodiments described here and to the use of an internal combustion engine in one of the embodiments described here for powering a motor vehicle, aircraft, or ship.

BRIEF DESCRIPTION OF THE DRAWINGS

One embodiment of the internal combustion engine according to the invention is described in greater detail below with reference to the figures.

6

DETAILED DESCRIPTION OF THE PREFERRED EMBODIMENT(S)

Figure 1:
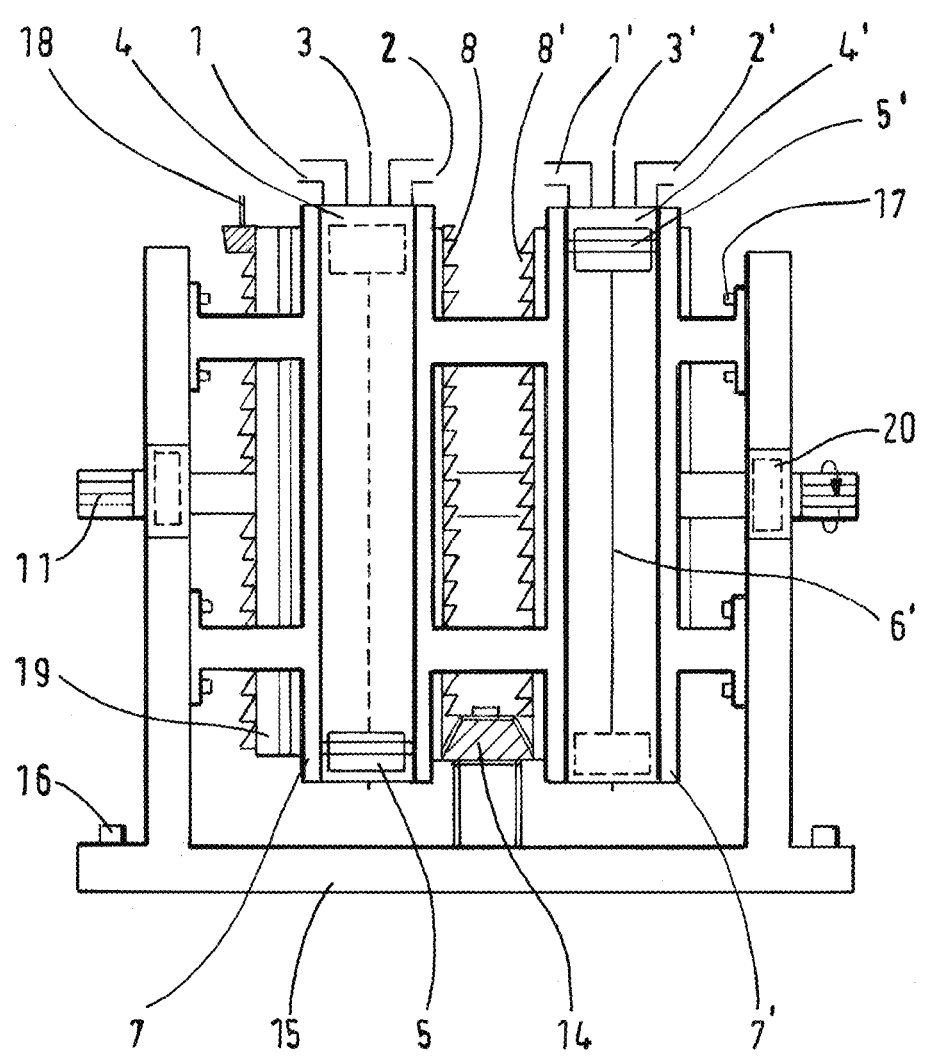
FIG. 1 shows a front view of one embodiment of the internal combustion engine according to the invention.
Figure 2:
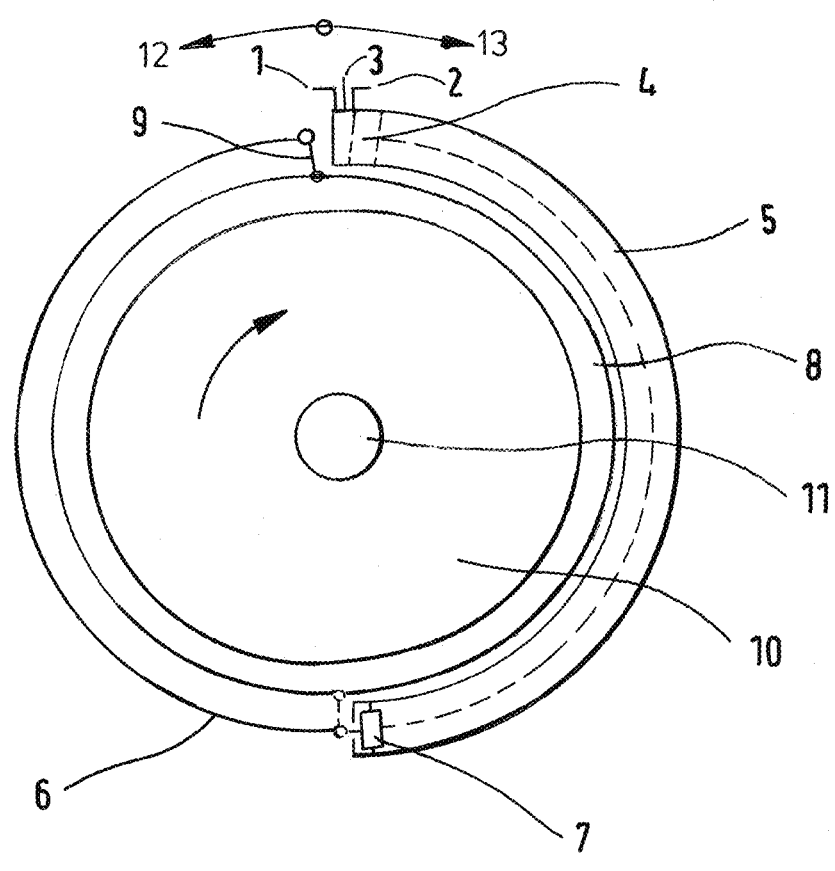
FIG. 2 shows a view of one side of the ensemble comprising the shaft, freewheel, and cylinders of the embodiment of the internal combustion engine according to the invention.

The embodiment of the internal combustion engine according to the invention shown in the figures comprises two identical circular arc-shaped cylinders 7, 7' having a circular cross section, in each of which there is one piston 5, 5' having one circular arc-shaped piston rod 6, 6' connected to the side of the piston 5, 5' opposite the combustion chamber 4, 4'. The pistons 5, 5' running back and forth in each of the cylinders 7, 7' between the positions $P_{min}$ (that is, the position of the piston at the minimum distance from the cylinder head) and $P_{max}$ (that is, the position of the piston at the maximum distance from the cylinder head) are sealed off from the combustion chamber 4, 4' in a typical manner, for example by means of piston rings.

The cylinders 7, 7' are each disposed above the outer ring 8, 8' of one of the annular freewheels associated with each cylinder. The end of the piston rod 6, 6' opposite the piston is then fixedly connected to the outer ring 8, 8' of the associated freewheel by means of a connecting bar 9, 9'.

The inner rings 10, 10' of the freewheels are fixedly connected to a shaft 11 supported in a mount 15.

The cylinders 7, 7' are disposed such that the pistons 5, 5' running back and forth in the same perform opposite, circular arc-shaped motions.

The freewheels, in turn, are disposed so as to lock in the direction of motion of the piston from $P_{min}$ to $P_{max}$ in each case, that is, so that said freewheels are each in the driving mode in which the outer ring is displaced in the direction 13, and each run free in the opposite direction of the outer ring motion 12 in which the piston is displaced from $P_{max}$ to $P_{min}$.

The result is thus that the two locking directions are in the same direction, that is, that the shaft 11 receives a torque transferred in the same direction from the combustion process in both cylinders.

The outer rings 8, 8' of the two freewheels each have gear teeth on the circular disc-shaped lateral surfaces thereof facing toward each other. Said gear teeth are coupled by a spur gear 14 so that the outer rings 8, 8' of the freewheels are displaced in opposite directions, whereby the motion of each piston from $P_{max}$ to $P_{min}$ transmitted by the piston rods is brought about in the freewheeling mode.

During operation of the engine, a fuel-air mixture is fed into the combustion chamber 4, 4' of the cylinder 7, 7' through an intake valve 1,1'; the combustion gases to be dispelled from the cylinder 7, 7' in each case are discharged from the cylinder through an exhaust valve 2, 2'.

The igniting of the fuel-air mixture takes place by means of a spark plug 3, 3' present in the combustion chamber of each cylinder.

Figure 3:
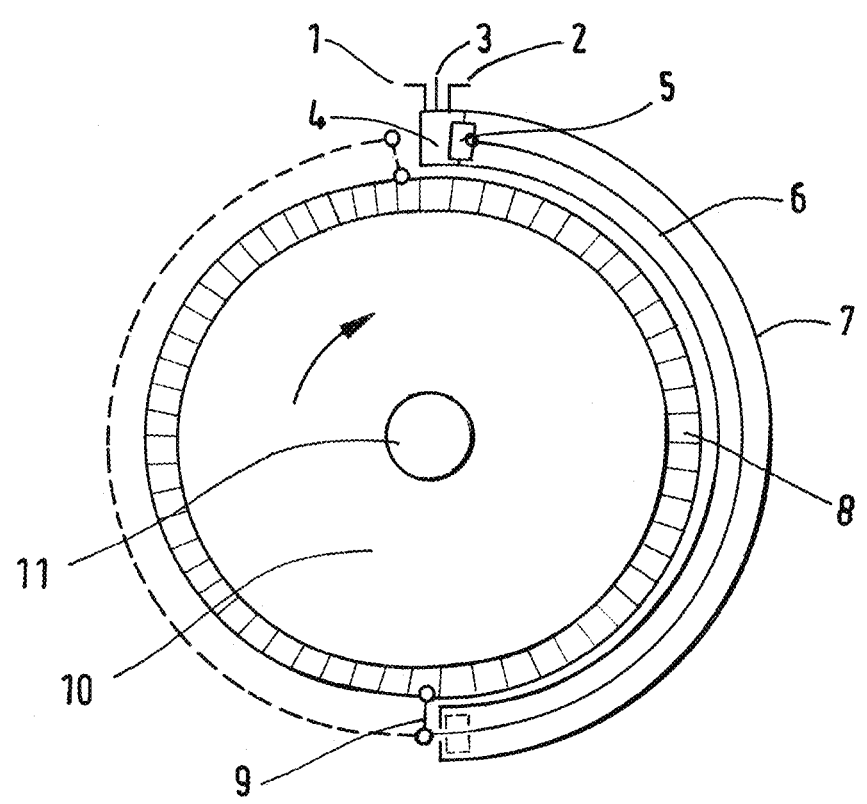
FIG. 3 shows an opposite side view from that of FIG. 2 of the ensemble of the shaft, freewheel, and cylinders of the embodiment of the internal combustion engine according to the invention.

For example, the ignition takes place in the first cylinder 7 of the engine at a position near $P_{min}$ of the piston, as shown in FIG. 3. The piston 5 is thereby displaced along a circular arc-shaped path in the first cylinder 7 by the force arising from the explosive combustion process, wherein said force is transferred to the outer ring 8 of the freewheel associated with the first cylinder. Said freewheel is in the driving mode, so that the force is transferred to the shaft 11 as a torque in the direction 13.

When the piston 5 arrives at $P_{max}$ in the first cylinder 7, the piston 5 in the second cylinder 7' is at $P_{min}$ and the ignition in the second cylinder 7' takes place near said position. The piston 5 is thereby displaced along a circular arc-shaped path in the second cylinder 7' by the force arising from the explosive combustion process, wherein said force is transferred to the outer ring 8 of the freewheel associated with the second cylinder 7'. Said freewheel is in the driving mode, so that the force is transferred to the shaft 11 as a torque in the direction 13 as well. By coupling the two outer rings 8, 8' of the freewheels, the pistons 5 and 5' in the first 7 and second cylinder 7' respectively are returned from $P_{max}$ to $P_{min}$, wherein the freewheels are each in the freewheeling mode thereof for said motions in the direction 12.

The cylinders 7, 7' are mounted on the support device of the engine 15 by means of an attaching device 17. Gear teeth 19 in which a gear of the starter motor 18 engages are present on the outer side of the freewheel associated with the second cylinder on the side thereof facing toward the mount.

The support device of the engine 15 may be anchored to the foundation by means of fastening screws 16. Furthermore, bearings 20 for the shaft are present in the support device 15.

REFERENCE LIST

1,1' Intake valve
2,2' Exhaust valve
3,3' Spark plug
4,4' Combustion chamber
5,5' Piston
6,6' Piston rod
7,7' Cylinder
8,8' Outer ring of freewheel, with gear teeth
9,9' Connecting bar between piston rod and outer ring of freewheel
10,10' Inner ring of freewheel
11 Shaft
12 Freewheeling direction of freewheel
13 Locking direction of freewheel
14 Connecting gear
15 Support device
16 Fastening screws
17 Cylinder mount
18 Starter motor
19 Gear teeth for starter motor
20 Bearing

The invention claimed is:

1. An internal combustion engine having first and second cylinders having a circular arc shape in a longitudinal direction thereof, one piston being disposed in each of said cylinders so as to be movable from a position at a minimum distance from a cylinder head to a position at a maximum distance from the cylinder head, and a shaft, the cylinders being disposed such that motion of the piston in the first cylinder generated by combustion of fuel in a combustion chamber of the first cylinder and motion of the piston in the second cylinder generated by combustion of fuel in a combustion chamber of the second cylinder occur in a same direction, wherein:
one piston rod having a circular arc shape in a longitudinal direction thereof, and one freewheel associated with each cylinder are present at sides of the pistons facing away from the combustion chambers, wherein the cylinders are further disposed so that an axis of the shaft is a center point of a circle defining a circular arc shape of the cylinders and of the piston rods, a side of each piston rod opposite the piston of the first cylinder and the second cylinder is connected to an outer side of one of the freewheels, and inner sides of the freewheels are each connected to the shaft, the freewheels are disposed such that motion generated by the combustion of fuel in the combustion chamber of a cylinder and transferred by the piston rod of a piston to the outer side of the freewheel is transferred to the shaft, and the freewheels each run freely in an opposite direction, and the outer sides of the freewheels are coupled to each other so as to perform a motion in the opposite direction, wherein the motion of the pistons in the first and second cylinders also runs in opposite directions.

2. The internal combustion engine according to claim 1, wherein the motions of the pistons in the cylinders are such that, when the piston of the first cylinder is present at the position of minimal distance from the cylinder head, the piston is present in the second cylinder at the position of maximum distance from the cylinder head.

3. The internal combustion engine according to claim 1, wherein the circular arc-shaped longitudinal extent of one or both cylinders is 60° or more with respect to the circle defining the circular arc shape thereof.

4. The internal combustion engine according to claim 1, wherein the circular arc-shaped piston path of the piston in one or both cylinders is 60° or more with respect to the circle defining the circular arc shape thereof.

5. The internal combustion engine according to claim 1, wherein the coupling of the outer sides of the freewheels comprises a gear connection.

6. The internal combustion engine according to claim 1, wherein one or both cylinders are disposed directly above the outer side of the respectively associated freewheel.

7. The internal combustion engine according to claim 1, wherein the cylinders are disposed offset with respect to a circle defined by the axis of the shaft as the center point.

8. The internal combustion engine according to claim 1, wherein at least one intake valve and one exhaust valve are present for each cylinder.

9. A method for operating the internal combustion engine according to claim 1.

10. A method of using an internal combustion engine according to claim 1, comprising powering a motor vehicle, aircraft, or ship.

11. The internal combustion engine according to claim 1, wherein the circular arc-shaped longitudinal extent of one or both cylinders is 90° or more with respect to the circle defining the circular arc shape thereof.

12. The internal combustion engine according to claim 1, wherein the circular arc-shaped longitudinal extent of one or both cylinders is 120° or more with respect to the circle defining the circular arc shape thereof.

13. The internal combustion engine according to claim 1, wherein the circular arc-shaped longitudinal extent of one or both cylinders is 160° or more with respect to the circle defining the circular arc shape thereof.

14. The internal combustion engine according to claim 1, wherein the circular arc-shaped piston path of the piston in one or both cylinders is 90° or more with respect to the circle defining the circular arc shape thereof.

15. The internal combustion engine according to claim 1, wherein the circular arc-shaped piston path of the piston in one or both cylinders is 120° or more with respect to the circle defining the circular arc shape thereof.

16. The internal combustion engine according to claim 1, wherein the circular arc-shaped piston path of the piston in one or both cylinders is 160° or more with respect to the circle defining the circular arc shape thereof.

* * * * *